April 12, 1932. E. S. GOODSPEED 1,853,609
ELECTRIC WELDING APPARATUS
Filed Nov. 30, 1928   2 Sheets-Sheet 1

Inventor
Elvin S. Goodspeed
By Blackmore, Spencer & Flint
Attorneys

April 12, 1932. E. S. GOODSPEED 1,853,609
ELECTRIC WELDING APPARATUS
Filed Nov. 30, 1928 2 Sheets-Sheet 2
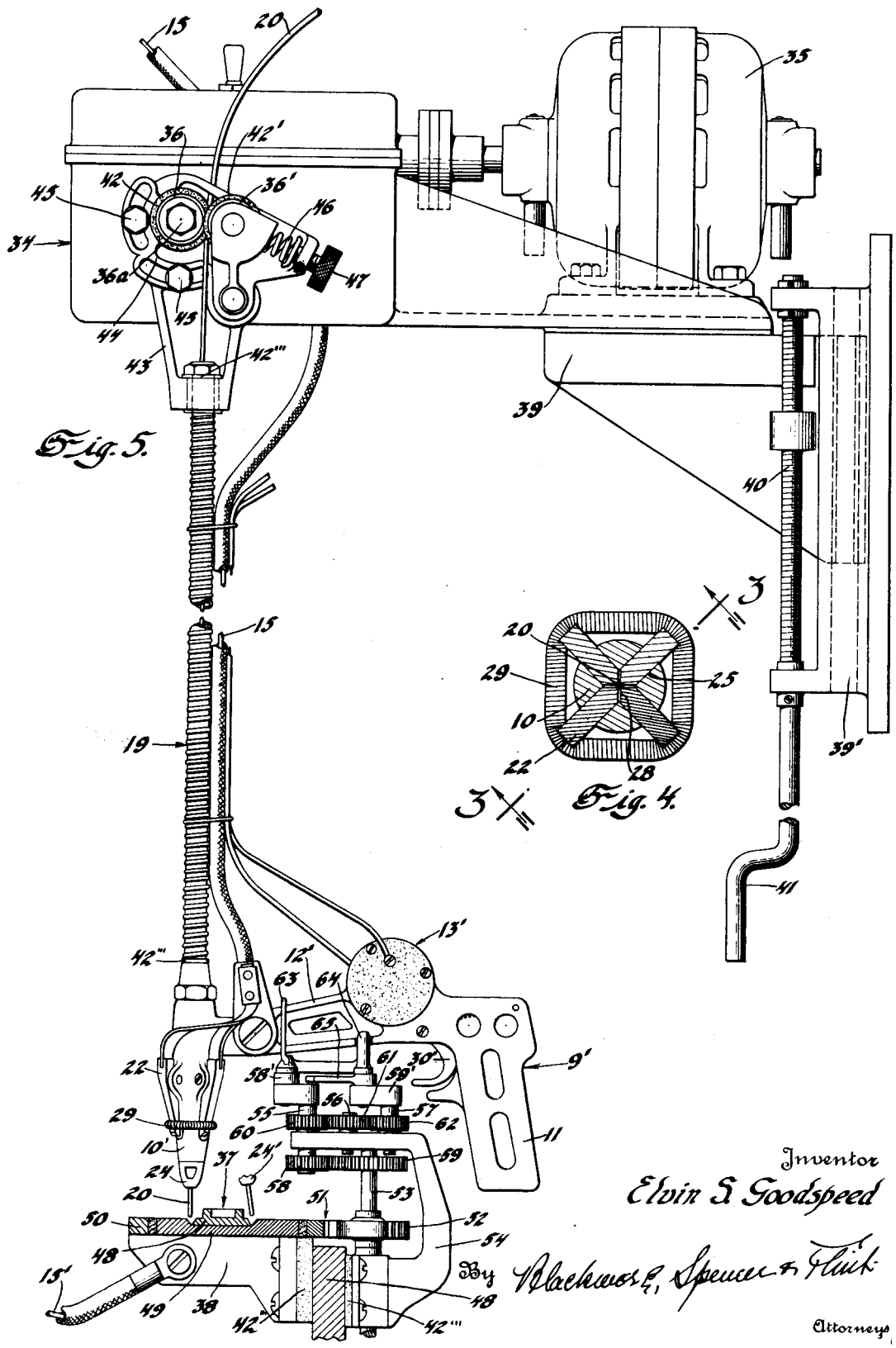
Inventor
Elvin S. Goodspeed Patented Apr. 12, 1932

1,853,609

UNITED STATES PATENT OFFICE

ELVIN S. GOODSPEED, OF DETROIT, MICHIGAN, ASSIGNOR TO GENERAL MOTORS CORPORATION, OF DETROIT, MICHIGAN, A CORPORATION OF DELAWARE

ELECTRIC WELDING APPARATUS

Application filed November 30, 1928. Serial No. 322,724.

Although somewhat broadly entitled, this invention relates more particularly to means suitable for positioning a conductive welding pencil such as may be used in connection with an automatic feed-control or welding-head organization.

Typically, an installation in which the present invention is employed may comprise, in addition to a stationary or vertically adjustable feed-control organization, a dependent and/or flexible but inextensible antibuckling guide, serving as a guard for the automatically advanced welding pencil, and a pencil-positioning device of the general character referred to,—the latter device typically comprising a pencil-receiving, tubular head or nozzle element and a manually or mechanically engageable handling element which may be laterally and directly or indirectly connected therewith.

Other objects of this invention, including preferred details of construction adapting said pencil-receiving nozzle to conduct a welding current, as by means of brushes pivotally connected and resiliently pressed into engagement with said welding pencil, and optionally including means for the mechanical manipulation of either the mentioned positioning means, or the work disposed below said pencil, and also means for so closing and opening an arc-starting circuit as to initiate or discontinue the operation of the automatic feed-control organization, may be best appreciated from the following description of an illustrative embodiment thereof, taken in connection with the appended claims and the accompanying drawings.

In the drawings:

Fig. 4 is an additional sectional detail view, taken substantially as indicated by line 4—4 of Fig. 1.

Fig. 5 is a general and somewhat diagrammatic side elevational view of an installation in which a positioning and conducting device of the general character referred to is shown in combination with an automatic pencil-advancing control device and with automatic means for advancing work and for manipulating said positioning device.

Figure 1:
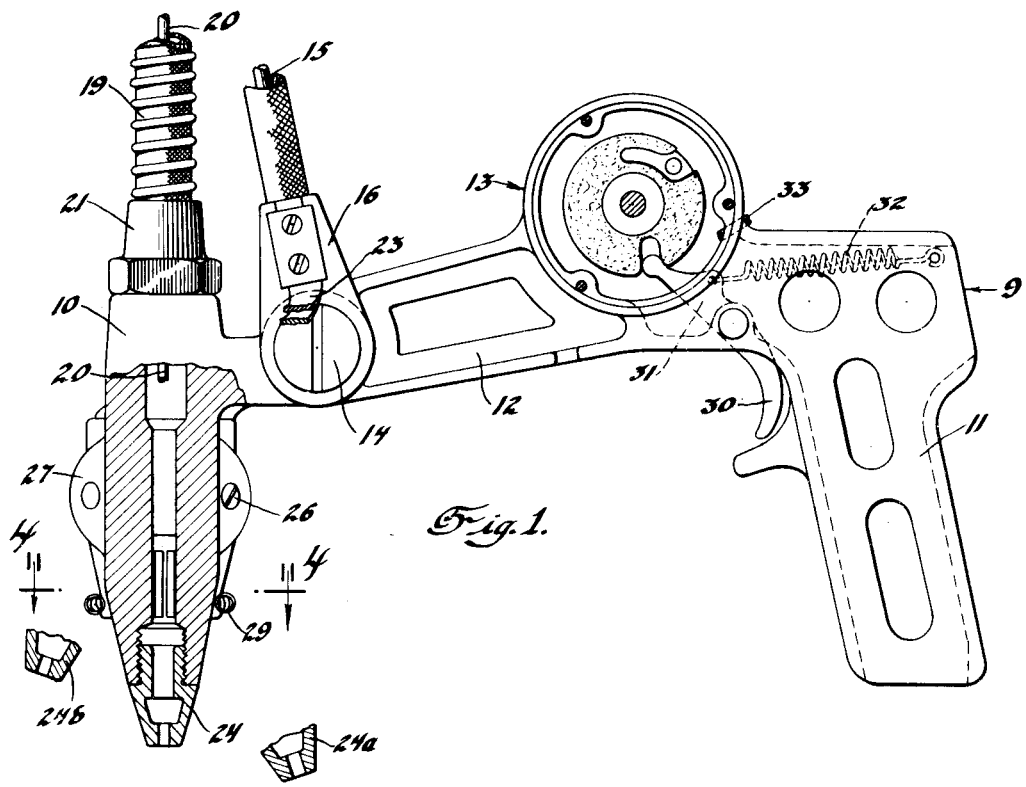
Fig. 1 is a side elevational view showing preferred details of construction of a welding pencil holder, or electrode-positioning and welding-current conducting means, to which the present invention is more particularly directed,—a pencil-receiving nozzle included in said holder but cut away to a substantially median plane.
Figure 2:
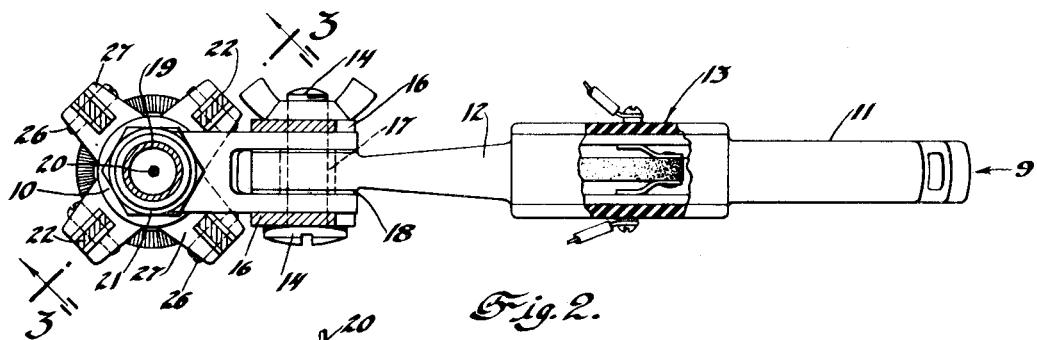
Fig. 2 is a top plan view corresponding to Fig. 1 but showing parts as differently cut away.
Figure 3:
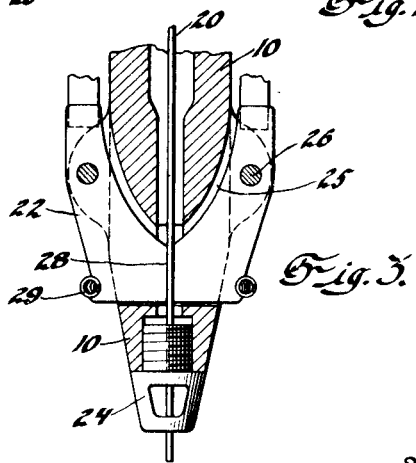
Fig. 3 is a sectional detail view, taken substantially as indicated by the line 3—3 of Fig. 2.

Referring first to preferred details of the positioning and welding-current conducting device 9 shown in Figs. 1-4 inclusive, a so-called tubular barrel or pencil-receiving nozzle 10 is shown as laterally connected with a handle 11 (which may be of pistol-grip type and may include a shank portion 12 carrying a switch 13) by means comprising a threaded pivot pin 14. This pivot pin may serve also for the attachment of a welding-current conductor 15 by means such as a saddle-shaped connecting element 16,—said pin and connector being insulated from said handle (in case the latter is formed of a conductive material) by means such as an insulating bushing 17 and insulating washers 18.

An entire handling or positioning device of the general character referred to may be dependently supported by means such as a flexible and substantially inextensible pencil-protecting element 19, adapted to guide and to prevent buckling of the welding strip or pencil 20,—said guide being shown as formed of wire-wound rubber tubing and as connected with the barrel 10 by means of a clamping nut 21; and the welding-current may be brought from the connecting element 16, or its equivalent, to said pencil, near the tip thereof, by means such as pivotally supported brush elements 22, shown as connected therewith by means of flexible strips 23,—which may be formed of copper braid, or the like.

The barrel or nozzle 10 is shown as terminally provided with a nose-piece 24, having threaded engagement therewith; and the brushes 22 are shown as radially disposed in suitable slots 25, as retained by pivot pins 26.

extending through bearing lugs 27, as shaped, at 28, favorably to an extensive but slidable engagement of the welding pencil 20, and as resiliently pressed thereto by means of an annular helical spring 29.

The pistol-grip handle 11 is shown as provided with a trigger-like finger piece 30, comprising a switch-operating arm 31; and the latter may be constantly biased toward a switch-opening position by means such as a tension spring 32,—a stop for the arm 31 being indicated at 33; but it should be understood that the switch 13 may be of any usual or preferred character. For example, it may be either such as to complete a circuit only so long as pressure is applied to the finger-piece 30, or it may, according to the conditions of its use, be adapted to open and to close the motor-starting or the arc-starting circuit upon alternate application of pressure thereto,—the details of alternative modes of connection with a control panel, or the like, being known and immaterial to the present invention.

Upon reference to Fig. 5, in connection with the above, it will be understood that, although the switch 13' might be employed either directly to complete a welding circuit or to directly complete a circuit through the coils of a motor employed to advance an electrode pencil and/or successively to manipulate a plurality of circuit-closing elements or for both of these purposes or for other purposes, according to the pressure applied to finger-piece 30', said switch 13' is preferably used only for an indirect arc-starting effect,—this last phrase being used as inclusive of an arc-stopping effect. That is to say, the advance of the electrode pencil 20 is preferably accomplished by means such as some automatic feed-control or welding head unit 34, of any usual or preferred type,—the organizations disclosed in my pending application, Serial No. 398,198, filed July 22, 1920, being instanced merely as examples; and the direction of movement imparted by the motor 35 to feed rollers such as are suggested at 36, 36' is thus preferably rendered dependent upon the characteristics and requirements of an arc assumed to be formed by a welding current flowing through conductor 15, pencil 20, work 37, and a return conductor 15' upon the closing of the switch 13'.

If desired, either some work support 38, or an element such as a bracket 39, carrying the mentioned welding-head organization 34, may be rendered vertically or otherwise adjustable relatively to some fixed element 39' (as, by means of a screw 40 and a crank 41) in adaptation to jobs differing in thickness or otherwise occasioning a variation in the distance between mentioned parts; and, in preferred embodiments, the flexible guide 19, or its equivalent is intended to be dependently supported from or in proximity to an automatic or self-regulating welding head,—as, by means of a connection fitting 43. Insulation is suggested at 42'''; and the fitting 43 may be pivotally or adjustably secured (as, by means comprising a slotted plate 44 and screws or bolts 45) with reference to a shaft 36a carrying roller 36,—to which the companion roller 36' may be resiliently pressed, as by means of a spring 46, shows as adjustable by a screw 47.

As suggested at 24a and 24b, Fig. 1, the nozzle 10 of any suitable positioning device or holder 10 (or 10') may be adjustable to any desired angle with reference to the shank 12 (or 12') and/or the pistol-grip or other handle 11 (or 11'); said handle may be inclined, advanced and/or retracted in any desired manner, to conform to the requirements of a specific job; and it will be understood that, in case the manipulation of the handling device 9 (or 9') occasions a variation in the distance between the nose or tip element 24 thereof and any work 37 (as may result from a swinging of said tip element to such a position as is suggested at 24', Fig. 5,) this variation in distance may be automatically compensated substantially as if it were due to consumption of the electrode pencil,—the flexible guide 19 being relied upon substantially to prevent buckling of pencil 20, as advanced by rollers 42, 42' in opposition to any retarding effect of brushes 22.

Any desired lateral swinging or other movement of a nozzle 10 (or 10'), or guide 19 or positioning device 9 (or 9') and/or of any work 37 may be effected either by manual manipulation or by suitable mechanical and/or automatic means. For example, assuming that bearing elements 48 are to be welded in depressions provided in a large number of plates 49, sets of said plates may be secured in suitable frames 50, provided with interrupted racks 51,—engageable by interrupted gears 52 in such a manner as to effect intermittent advance of said frames; and a driven shaft 53, shown as carrying the mentioned interrupted gear, may serve also indirectly to impart cyclical movements to nozzle 10 (or 10'), or its equivalent, during periods of rest of the frame 50. For example, a suitable arm 54 may provide bearings for a plurality of short shafts 55, 56 and 57,—the shaft 55 being provided not only with a gear 58, constantly engaged by a larger gear 59 upon shaft 53, but with an additional gear 60 adapted to impart corresponding movement to gears 61 and 62 upon shaft 56 and 57. The shafts 55 and 57 may respectively carry cranks 58' and 59' adapted to function as parallel links or arms in imparting movement to one or more pairs of rigid or resilient fingers 63 and 64, adapted to receive the shank 12 (or 12') of a handling device 9 (or 9') or the like; the switch 13' may be such as to close a circuit upon each alternate depression or inward movement of the finger-piece 30', or its equivalent, intervening movements thereof having a circuit-opening effect; and/or means such as a cam element 65, shown as carried by the crank 59', may be employed intermittently to engage said finger-piece or any preferred switch-operating element, at suitable intervals.

It will be understood that the described organization adapts the pencil-handling device 9 (or 9') and/or the switch 13' to be mechanically manipulated in suitably timed relationship to the intermittent advance of work 37, while nevertheless admitting of a tilting or other guidance, or even a complete upward withdrawal, of said handling device, at will, from between the pairs of fingers 63, 64,—to permit said handling device to be manually manipulated in any desired manner.

Although the foregoing description includes but one complete embodiment of the present invention, suggesting various alternative details and optional features, it should be understood not only that various features thereof are believed to be capable of independent use but also that numerous additional modifications might easily be devised,—without embodying the slightest departure from the spirit of the present invention, as indicated above and in the following claims.

I claim:

1. In means for positioning and energizing a conductive welding pencil: a pencil-receiving nozzle element adapted to be carried by a flexible guide element; and a manually engageable handle element laterally connected with said nozzle element; said nozzle element being provided with pivoted contact elements which are resiliently pressed by an annular helix.

2. In electric welding apparatus, the combination with a flexible guide for a welding pencil, means near one end of said guide adapted to feed said pencil automatically in accordance with the rate of fusion, a manually manipulable head at the other end of the guide through which the pencil may be fed, a work holder adapted to support said head, means for automatically traversing said head relative to the work on said holder, means on said head for initiating and interrupting the welding operation, and means on said holder for actuating said last mentioned means.

3. In electric welding apparatus, a nozzle adapted to receive a welding pencil and hold same in proximity to a work-piece, a plurality of contacts carried by said nozzle and movable toward and from said pencil, and a resilient member so positioned as to force said contacts toward said pencil and removable to permit free movement of said contacts away from said pencil.

4. In electric welding apparatus, a nozzle adapted to receive a welding pencil and hold same in proximity to a work-piece, a plurality of contacts carried by said nozzle and engageable with said pencil, resilient means for forcing said contacts toward said pencil, and electric conductors connected independently to each of said contacts.

5. In electric welding apparatus, a nozzle adapted to receive a welding pencil and hold same in proximity to a work-piece, a plurality of contact brushes pivoted to said nozzle and positioned to engage said pencil and a spring removably engaging said brushes and arranged to force the brushes against the pencil.

In testimony whereof I affix my signature.

ELVIN S. GOODSPEED.